(12) United States Patent
Chung et al.

(10) Patent No.: US 11,307,589 B2
(45) Date of Patent: Apr. 19, 2022

(54) VESSEL NAVIGATION SYSTEM AND NAVIGATION METHOD THEREOF

(71) Applicant: SHIP AND OCEAN INDUSTRIES R&D CENTER, New Taipei (TW)

(72) Inventors: Feng-Yeang Chung, New Taipei (TW); Ching-Chin Tu, New Taipei (TW); Chun-Han Chu, New Taipei (TW); Min-Hsiang Hsu, New Taipei (TW)

(73) Assignee: SHIP AND OCEAN INDUSTRIES R&D CENTER, New Taipei (TW)

( * ) Notice: Subject to any disclaimer, the term of this patent is extended or adjusted under 35 U.S.C. 154(b) by 444 days.

(21) Appl. No.: 16/371,106

(22) Filed: Mar. 31, 2019

(65) Prior Publication Data

US 2020/0310434 A1 Oct. 1, 2020

(30) Foreign Application Priority Data

Mar. 27, 2019 (TW) ................. 108110812

(51) Int. Cl.

| | |
|---|---|
| *G05D 1/02* | (2020.01) |
| *G08G 3/02* | (2006.01) |
| *H04W 4/80* | (2018.01) |
| *H04W 4/029* | (2018.01) |
| *B63B 49/00* | (2006.01) |

(52) U.S. Cl.
CPC ........... *G05D 1/0206* (2013.01); *B63B 49/00* (2013.01); *G08G 3/02* (2013.01); *H04W 4/029* (2018.02); *H04W 4/80* (2018.02)

(58) Field of Classification Search
CPC ...... G05D 1/0206; G05D 1/0212; G08G 3/02; H04W 4/80; H04W 4/029; B63B 49/00; G01C 21/203; Y02T 70/00

USPC ........................................................... 701/21
See application file for complete search history.

(56) References Cited

U.S. PATENT DOCUMENTS

| | | | |
|---|---|---|---|
| 7,957,858 B1* | 6/2011 | Larson | G05D 1/0206 |
| | | | 701/23 |
| 10,640,190 B1* | 5/2020 | Gonring | B63H 25/42 |
| 2016/0101838 A1* | 4/2016 | Kojima | B63H 25/04 |
| | | | 701/21 |

(Continued)

FOREIGN PATENT DOCUMENTS

| | | | | |
|---|---|---|---|---|
| CN | 106959698 A | * | 7/2017 | ........... G05D 1/0206 |
| JP | S61-278912 A | | 12/1986 | |

(Continued)

*Primary Examiner* — Krishnan Ramesh
(74) *Attorney, Agent, or Firm* — Cheng-Ju Chiang

(57) ABSTRACT

The present invention relates to a vessel navigation system and navigation method thereof, the method includes: (a) driving a vessel to sail along a sailing path including at least two nodes, the at least two nodes include a first node and a second node connected by a first line segment; (b) generating a first tracking point on the first line segment when a distance between the vessel and the first node being less than a first length, and driving the vessel to sail according to the first tracking point; (c) generating a second tracking point on the first line segment when a distance between the vessel and the first tracking point being less than the first length, and driving the vessel to sail according to the second tracking point; and then completing the navigation of the sailing path by repeating the step (b) and step (c) until the vessel passes through each node.

26 Claims, 13 Drawing Sheets

(56) References Cited

U.S. PATENT DOCUMENTS

| | | | |
|---|---|---|---|
| 2020/0033857 A1* | 1/2020 | Yu | G05D 1/0248 |
| 2020/0110412 A1* | 4/2020 | Nydahl | B63B 79/40 |
| 2020/0217980 A1* | 7/2020 | Winfield | B63B 21/66 |
| 2020/0247431 A1* | 8/2020 | Ferencz | B60W 60/001 |

FOREIGN PATENT DOCUMENTS

| | | |
|---|---|---|
| JP | H1-280807 A | 11/1989 |
| JP | H11-272999 A | 10/1999 |
| JP | 2002-178990 A | 6/2002 |
| JP | 2003-187399 A | 7/2003 |
| JP | 2004-42884 A | 2/2004 |
| JP | 2004-355105 A | 12/2004 |
| JP | 2014-98948 A | 5/2014 |
| JP | 2017-154734 A | 9/2017 |
| KR | 10-2013-0104860 A | 9/2013 |
| KR | 10-1707401 B1 | 2/2017 |

\* cited by examiner (e) Driving a vessel to sail along a sailing path, the sailing path including at least two nodes, wherein the at least two nodes include a first node, a second node and a third node, the first node and the second node are connected by a first line segment, and the second node and the third node are connected by a second line segment.

(f) Generating a first tracking point on the first line segment when a distance between the vessel and the first node being less than a first length, and driving the vessel to sail according to the first tracking point, wherein the first tracking point is away from the first node by a second length.

(g) Generating a second tracking point on the second line segment when a distance between the vessel and the first tracking point being less than the first length and a distance between the first tracking point and the second node being less than the second length, and driving the vessel to sail according to the second tracking point, wherein the second tracking point is away from the first tracking point by the second length.

(h) Repeating the step (f) and step (g) until the vessel passes through each node.

FIG. 2B (E) Driving the vessel to sail along the sailing path, the sailing path including at least two nodes, wherein the at least two nodes include the first node, the second node and the third node, the first node and the second node are connected by the first line segment, and the second node and the third node are connected by the second line segment.

(F) Driving the vessel to sail along the first line segment, wherein the vessel is deviated from the sailing path by the external factor.

(G) Generating the second tracking point on the first line segment when a distance between the vessel and the first tracking point being less than the first length, and driving the vessel to sail according to the second tracking point, wherein the second tracking point is away from the first tracking point by the second length.

(H) Returning the vessel back to the original sailing path to complete the trajectory modification navigation.

FIG. 8B

VESSEL NAVIGATION SYSTEM AND NAVIGATION METHOD THEREOF

TECHNICAL FIELD

The present disclosure relates to a vessel navigation system and a navigation method thereof, more particularly to a vessel navigation system for reducing deviation of sailing path and a navigation method thereof.

DESCRIPTION OF THE RELATED ART

With the development of the shipbuilding technology, vessels become the main tool in marine transportation. Navigation systems and path modification play an extremely important role during the marine transportation either in normal vessels or the self-sailing ships, which have been actively developed recently. Therefore, how to bring more economic effects to the shipping transportation and to reduce the cost of the transportation have become essential design targets.

Conventionally, the methods of the line of sight (LOS) or the parallel correction (PC) are adopted as the basis of the sailing and to navigate the sailing path of the vessel. However, the LOS and the PC may merely generate the reference direction by the relative location between the current location of the vessel and the node of the sailing path to navigate the vessel to move toward to the target node. The LOS and the PC may not be able to modify the deviation of the sailing path resulting from the external force, such as the wind, the waves and the ocean currents.

In addition, with respect to the sailing path including a plurality of nodes, either using the LOS or the PC, it is easily to have an overshoot effect, as shown in FIG. 11, at the turning positions, which is resulted from the over-rudder (or overshooting) for modifying the deviation. If there are plenty of turning points on the predetermined sailing path, the overshoot effect may be often occurred, which may increase the sailing time, the wasting of the fuel and the tear of the sailing equipment.

SUMMARY

In order to solve the problems of how to avoid the overshoot effect occurred at the turning positions of the sailing path during the navigation, or the modification of the deviation of the sailing path due to the environmental factors, the present disclosure relates to a navigation method including the following steps. (a) driving a vessel to sail along a sailing path, the sailing path including at least two nodes, wherein the at least two nodes include a first node and a second node being connected by a first line segment; (b) generating a first tracking point on the first line segment when a distance between the vessel and the first node being less than a first length, and driving the vessel to sail according to the first tracking point, wherein the first tracking point is away from the first node by a second length; (c) generating a second tracking point on the first line segment when a distance between the vessel and the first tracking point being less than the first length, and driving the vessel to sail according to the second tracking point, wherein the second tracking point is away from the first tracking point by the second length; and (d) repeating the step (b) and step (c) until the vessel passes through each node.

In another aspect, the present disclosure relates to another navigation method including the following steps. (e) driving a vessel to sail along a sailing path, the sailing path including at least two nodes, wherein the at least two nodes include a first node, a second node and a third node, the first node and the second node are connected by a first line segment, and the second node and the third node are connected by a second line segment; (f) generating a first tracking point on the first line segment when a distance between the vessel and the first length being less than a first length, and driving the vessel to sail according to the first tracking point, wherein the first tracking point is away from the first node by a second length; (g) generating a second tracking point on the second line segment when a distance between the vessel and the first tracking point being less than the first length and a distance between the first tracking point and the second node being less than the second length, and driving the vessel to sail according to the second tracking point, wherein the second tracking point is away from the first tracking point by the second length; and (h) repeating the step (f) and step (g) until the vessel passes through each node.

In another aspect, the present disclosure relates to a vessel navigation system, including: a data transceiver configured to receive a sailing path; a processor connected to the data transceiver, wherein the processor includes a path navigator, the path navigator is configured to generate a course control command and a speed control command by configuring the sailing path in accordance with a navigation method; a direction controller connected to the processor, wherein the direction controller is configured to control a direction of a vessel according to the course control command; and a propeller module connected to the processor, wherein the propeller module is configured to control a speed of the vessel according to the speed control command.

The above summary of the present disclosure is to provide a basic description of the various aspects and features of the present disclosure. It is not a detailed description. Its purpose is not to specifically recite keys or critical elements of the present disclosure, and it is not intended to limit the scope of the present disclosure. It merely presents a few concepts of the present disclosure in a concise manner.

BRIEF DESCRIPTION OF THE DRAWINGS

FIG. 2B is a flowchart illustrating a navigation method in accordance with one embodiment of the present disclosure.

FIG. 8B is a flowchart illustrating a navigation method in accordance with another embodiment of the present disclosure.

DESCRIPTION OF THE PREFERRED EMBODIMENTS

To clarify the purpose, technical solutions, and the advantages of the disclosure, embodiments of the present disclosure will now be described more fully hereinafter with reference to the accompanying drawings.

Figure 1:
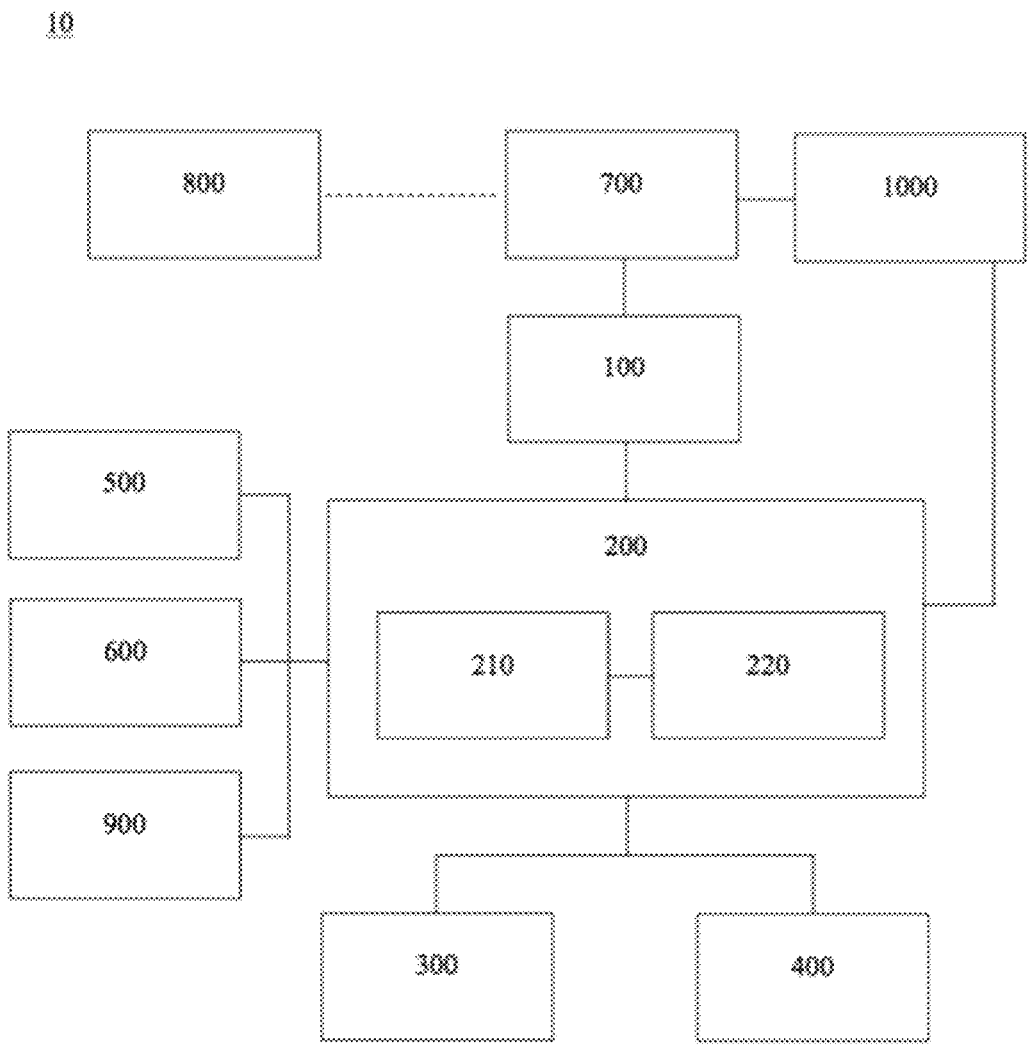
FIG. 1 is a schematic view illustrating a vessel navigation system in accordance with one embodiment of the present disclosure.

The present disclosure relates to a vessel navigation system and a navigation method. Referring to FIG. 1, FIG. 1 is a diagram illustrating a vessel navigation system in accordance with one embodiment of the present disclosure. It is noted that the vessel may not only include a general vessel, which is controlled by crew members, but also include the unmanned, ship such as self-driving vessels, autonomous navigation vessels, marine unmanned vehicles and surface automatic vehicles (collectively referred to as "unmanned ships" thereafter). Moreover, anything involved in the automatic control of the vessel or a vehicle's navigation route shall fall within the scope of the present disclosure. In addition, the appearance of the vessel may be designed as a streamlined low-resistance type, thereby increasing the stability of the control of the vessel.

As shown in FIG. 1, the vessel navigation system 10 includes a data transceiver 100, a processor 200, a direction controller 300 and a propeller module 400. The processor 200 connects to the data transceiver 100 and includes a path navigator 210. The direction controller 300 connects to the processor 200. In addition, the vessel navigation system 10 further includes a detecting module 500, a positioning module 600 and a wireless communicator 700. The detecting module 500 and the positioning module 600 connect to the processor 200. The wireless communicator 700 connects to the data transceiver 100. The processor 200 further includes a digital ocean chart database 220 connected to the path navigator 210.

Specifically, the vessel may not only include the general vessel having the crew members, but also include the maritime autonomous surface ships (MASS), as defined by the international maritime organization (IMO). It is collectively referred to as "unmanned ship" in the following description.

The following description may further explain the vessel navigation system of the present disclosure. The data transceiver 100 is configured to receive a sailing path from an outside. A receiving manner may be that the sailing path being directly input to the vessel, such that the vessel may sail according to the sailing path, or the sailing path may be wirelessly transmitted from an external device 800, such as a control center (e.g. shore center), another vessels or a satellite via the wireless communicator 700 connected to the data transceiver 100. A communication connection of the wireless communicator 700 may be established by Bluetooth, ZigBee, Wi-Fi, cellular (e.g. GSM, CDMA, GPRS or 4G/5G wireless), radio waves (e.g. RF, HF, VHF, UHF, or UHF) or satellite communication. It is noted that the transmission manner that the data is transmitted to a target by wireless means should be within the scope, and the present disclosure is not limited thereto.

The processor 200 connects to the data transceiver 100. The processor 200 is configured to receive the sailing path and to generate a course control command and a speed control command by adopted a navigation method onto the sailing path via the path navigator 210 configured within the processor 200. The navigation method will further be explained in FIG. 2 to FIG. 7.

In addition, in order to improve the accuracy of the calculation of the path navigator, the positioning module 600 of the processor 200 is configured to obtain a current coordinate (i.e., latitude and longitude) of the vessel or the unmanned ship in time. The positioning module 600 may be a global positioning system (GPS), a global navigation satellite system (GLONASS), a Beidou satellite navigation and positioning system, or combinations thereof. It is noted that the method which is able to obtain the coordinates of the vessel or the unmanned ship is within the scope, and the present disclosure is not limited thereto. Moreover, during the navigation of the vessel or the unmanned ship, there are also many external factors, such as wind, waves and ocean currents, as well as internal factors, such as manipulation of the vessel, which may influence the sailing path. Therefore, the vessel navigation system 10 of the present disclosure may further include the detecting module 500 (including at least one environment detector and at least one vessel detector) connected to the processor 200 for detecting at least one external environment data and at least one internal vessel data. The external environment data may include wind data, wave data, ocean current data, obstacle data or combinations thereof. The internal vessel data may include engine speed, speed, rudder angle or ship temperature.

Further, the path navigator 210 may adopt another navigation method to generate the course control command and the speed control command according to the sailing path, the current position of the vessel and the external environment data (as well as the internal vessel data). The navigation method will be further explained in FIG. 8A to FIG. 10.

The direction controller 300 connects to the processor 200 and is configured to control (change the direction of the steering angle) a direction of the vessel according to a course control command calculated by the path navigator 210. The propeller module 400 connects to the processor 200 and is configured to control the speed of the vessel according to the speed control command calculated by the path navigator 210. Accordingly, the vessel may be able to follow a trajectory of the predetermined sailing path to complete the navigation of the vessel.

In one embodiment, the data transceiver 100 may include an industrial computer (IPC), a human machine interface (HMI), a single chip or combinations thereof. However, the device which is able to transmit the vessel related data should be within the scope, and the present disclosure is not limited thereto. The processor 200 may be a programmable logic controller (PLC), a microcontroller unit (MCU) or a combination thereof. However, the device which is able to receive the information transmitted from each module and to transmit the control command after processing should within the scope, and the present disclosure is not limited thereto.

In one embodiment, the direction controller 300 may include a rudder, an electronic steering system or a combination thereof. The direction controller 300 is configured to adjust an angle of the rudder after receiving the command from the processor 200, thereby controlling the direction of the vessel. The propeller module 400 may include a generator, an engine, a thruster (lateral thruster), a throttle, a battery, a motor or combinations thereof. The propeller module 400 is configured to receive the command from the processor 200 and to adjust a magnitude of an output power to control a speed of the vessel. Further, the battery may be a lithium ion battery, a lithium polymer battery, a lithium iron phosphate battery, a fuel battery or combinations thereof. The battery may be designed according to the requirements of the propeller module. The propeller module may be a hybrid system having independent energy sources, such as a solar energy source, a wind energy source and a wave energy source, which are collected by solar panels, sails or wave energy driving devices arranged on the vessel. The independent energy sources may be converted into electric energy and be stored in the battery as the power source of the propeller module 400.

In one embodiment, the detecting module 500 may include at least one environment detector (not shown) and at least one vessel detector (not shown). Further, the at least one environment detector may include an air pressure sensor, a temperature sensor, a wind direction sensor, a humidity sensor, an optical sensor, an acoustic sensor, a radar sensor, a lidar sensor, a camera, an automatic identification system (AIS) or combinations thereof.

The air pressure sensor, the temperature sensor, the wind direction sensor and the humidity sensor may detect information, such as air pressure, wind direction, temperature and humidity of the environment around the vessel. The camera is configured to record actual monitoring images inside and outside of the vessel. The optical sensor, the acoustic sensor, the radar sensor, such as automatic radar plotting aids (ARPA) and the lidar, may transmit corresponding electromagnetic waves, sound waves or light beams into an external space, and may detect objects (such as reefs, other vessels or large animals) in the external space by receiving the reflecting electromagnetic waves, sound waves or light beams. The vessel automatic identification system may adopt geographic information system (GIS) and combine marine geographic information system (MGIS), international regulations for preventing collisions at sea (COLREGS), radar system and international computer network to control and collect vessel dynamic information and water environmental information in adjacent ocean area by active inquiry or passive notification.

The at least one vessel detector includes a fuel sensor, a power sensor, a gyroscope, a speed sensor, a rudder sensor, a tilt angle sensor or combinations thereof. The fuel sensor is configured to monitor a vessel's oil capacity. The power sensor is configured to monitor a vessel's power capacity. The gyroscope and the speed sensor are configured to monitor the speed of the vessel. The rudder sensor is configured to monitor the direction of the vessel. The tilt angle sensor is configured to monitor a tilt angle of the vessel with respect to the sea surface. Through the various sensors included in the detecting module, the original information of the vessel may be collected to facilitate the operation processing.

In one embodiment, the wireless communicator 700 may be an antenna, a Bluetooth communication module, a Wi-Fi communication module, a cellular network communication module, a radio wave communication module, a satellite communication module or combinations thereof. However, the device which is able to wirelessly transmit the data to a predetermined target should within the scope, and the present disclosure is not limited thereto.

Further, the vessel navigation system 10 may further include an automatic obstacle-avoiding module 900 connected to the processor 200, the detecting module 500 and the positioning module 600. The automatic obstacle-avoiding module 900 is configured to guide the vessel to avoid the obstacles via the information detected by the detecting module 500 and the positioning module 600. The automatic obstacle-avoiding module 900 may automatically determine a relative position and a relative speed between the sailing path and the obstacle, and notify the processor 200 immediately to control the vessel to evade the obstacle automatically. The automatic obstacle-avoiding module 900 may further include a radar analyzing unit, an image analyzing unit and the gyroscope. The radar analyzing unit (not shown) is configured to analyze a radar echo detected by the optical sensor, the acoustic sensor and the radar sensor to determine a size of the obstacle and a distance between the obstacle and vessel. The image analysis unit (not shown) is configured to analyze the images captured by the camera to determine the situation around the vessel. The gyroscope (not shown) may provide an orientation function. Such that, in combination with the current position of the vessel obtained by the positioning module 600, the automatic obstacle-avoiding module 900 may automatically plan an appropriate sailing path for the vessel to avoid the obstacles.

In addition, the vessel navigation system 10 may further include an information security module 1000 connected to the processor 200 and/or the wireless communicator 700. The information security module 1000 is configured to provide the vessel with a security protection mechanism when the processor 200 receives incorrect information or the wireless communicator 700 has a connection problem. If external information is not able to be received due to the connection problem of the wireless communicator 700, or the wireless communicator 700 is interfered or a third-party user, such as a malicious program or a virus, improperly controls operations of the processor 200, the information security module 1000 may automatically set the vessel to neutral and prohibit the wireless communicator of the vessel from receiving the external information or commands, so as to prevent collision accidents. Such that staffs may board the vessel for maintenance safely. The information security module 1000 is configured to monitor wireless communication transmission via an intrusion-detection system (IDS). The information security module 1000 is configured to determine whether there is any suspicious activity or any vessel which violates the navigation regulations, and to activate an alarm or transmit an active response upon determining. The information security module 1000 may further include an authentication system, such that only the users who pass identity verification is authorized (such as shared key or biometric authentication) to communicate with the vessel. The information security module 1000 may further include a firewall system established between an external device and the wireless communicator. The firewall system is configured to monitor and block inappropriate external information according to pre-defined protected content. The information security module 1000 may further include a whitelisting system or an application whitelisting configured to execute the listed modules or applications, and the applications not on the list may not be allowed to execute. In other words, the information security module 1000 may only allow the transmission and the execution of the modules and the applications configured within the vessel navigation system 10. When a module or an application outside of the list appears, the vessel navigation system 10 may not execute the module or the application, and may activate a warning immediately. The whitelisting system is configured to protect the vessel navigation system 10 at the front line to prevent the vessel navigation system 10 from an intrusion of malware to interfere the vessel.

In one embodiment, the processor 200 may further include a digital ocean chart database 220 connected to the path navigator 210. The digital ocean chart database 220 is configured to store historical sailing paths. When the vessel is sailing with the same sailing path, the digital ocean chart database 220 may use the historical sailing paths to assist the vessel to sail. Such that, the time and the power consumed by the processor 200 for re-calculating may be reduced. Moreover, the digital ocean chart database is configured to store at least one of a marine map, a geographic information system (GIS), voyage data, international collision avoidance regulations (COLREGS), marine environmental data, ocean current data, tidal current data, route information, port facility data, navigation aids, sailing sign data, current situation information, real-time information of the port, shipwreck database, weather forecast data, historical meteorological data, land bank database, ocean chart water depth point database, important road database, and lamp float database.

The navigation method will be further explained in the following description.

Figure 2A:
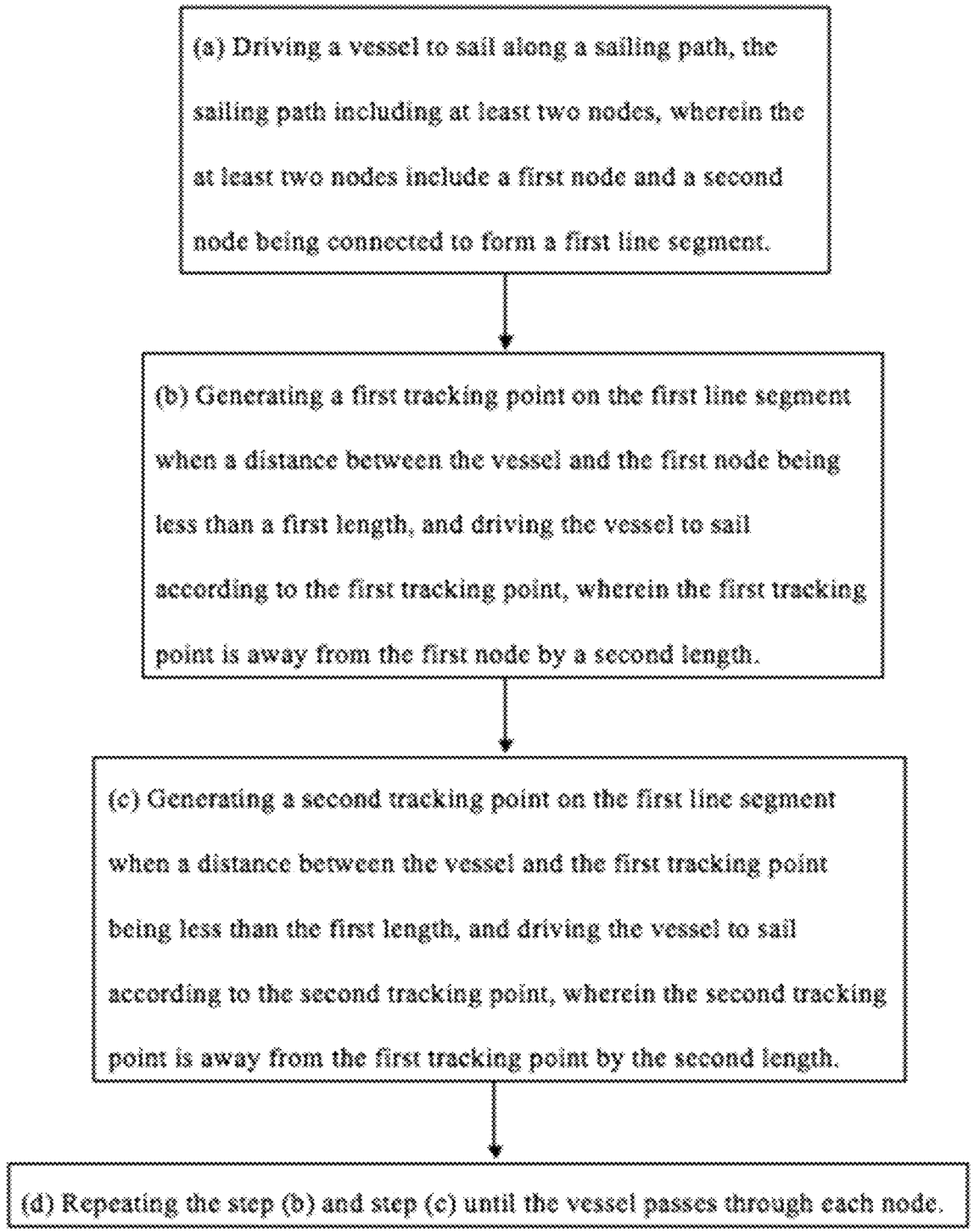
FIG. 2A is a flowchart illustrating a navigation method in accordance with one embodiment of the present disclosure.

Referring to FIG. 2A to FIG. 7, FIG. 2A is a flowchart illustrating the navigation method in accordance with one embodiment of the present disclosure (not cross-node), and FIG. 2B is a flowchart illustrating the navigation method in accordance with one embodiment of the present disclosure (cross-node). The navigation method includes the following steps. (a) driving the vessel to sail along the sailing path, the sailing path including at least two nodes, wherein the at least two nodes include a first node and a second node (the number of nodes may be set according to the sailing path, and the present disclosure is not limited thereto), the first node and the second node are connected by a first line segment; (b) generating a first tracking point on the first line segment when a distance between the vessel and the first node being less than a first length, and driving the vessel to sail according to the first tracking point, wherein the first tracking point is away from the first node by a second length; (c) generating a second tracking point on the first line segment when a distance between the vessel and the first tracking point being less than the first length, and driving the vessel to sail according to the second tracking point, wherein the second tracking point is away from the first tracking point by the second length; and (d) repeating the step (b) and step (c) until the vessel passes through each node.

In one example, after the step (a), the navigation method further includes step (a1), driving the vessel to sail along the first line segment, wherein the vessel is deviated from the sailing path by an external factor. After the step (a1), the navigation method enters the step (b). The external factor detected by the detecting module may include (as shown in FIG. 1) wind, waves, ocean currents, obstacles or combinations thereof. Or, the external factor may be an emergency event detected by the detecting module during the navigation, such as another vessel sails into the predetermined sailing path, a reef or a large ocean creature appears in the sailing path. The above situations may cause the vessel to deviate from the original sailing path to evade the obstacles.

In another example, as shown in FIG. 2B, the navigation method includes the following steps. (e) driving the vessel to sail along the sailing path, the sailing path including at least two nodes, wherein the at least two nodes include the first node, the second node and a third node (the number of nodes may be set according to the sailing path, and the present disclosure is not limited thereto), the first node and the second node are connected by the first line segment, and the second node and the third node are connected by the second line segment; (f) generating the first tracking point on the first line segment when the distance between the vessel and the first node being less than the first length, and driving the vessel to sail according to the first tracking point, wherein the first tracking point is away from the first node by the second length; (g) generating the second tracking point on the second line segment when the distance between the vessel and the first tracking point being less than the first length and a distance between the first tracking point and the second node being less than the second length, and driving the vessel to sail according to the second tracking point, wherein the second tracking point is away from the first tracking point by the second length; and (h) repeating the step (f) and step (g) until the vessel passes through each node. The difference between the navigation method shown in FIG. 2B and FIG. 2A reside in that the navigation method shown in FIG. 2B has a cross-node effect due to the distance between the original tracking point and the next node is less than the second length and the new tracking point has to be located on a connecting line formed by the original node and the next node. It is noted that, if the obstacles have been detected while the vessel V is sailing by tracking the tracking points, the vessel may evade the obstacles first before continuing to track the tracking points.

In one example, after the step (e), the navigation method further includes step (e1), driving the vessel to sail along the first line segment, wherein the vessel is deviated from the sailing path by the external factor. After the step (e1), the navigation method enters the step (f). The external factor detected by the detecting module may include (as shown in FIG. 1) the wind, the waves, the ocean currents, the obstacles or combinations thereof. Or, the external factor may be the emergency event detected by the detecting module during the sailing path, such as another vessel sails into the predetermined sailing path, the reef or the large ocean creature appears in the sailing path. The above situations may cause the vessel to deviate from the original sailing path to avoid the obstacles.

Figure 3:
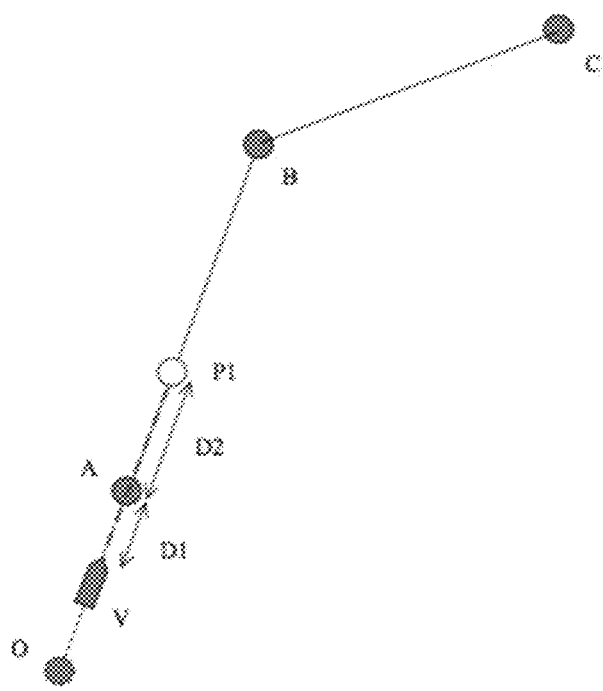
FIG. 3 is a schematic view illustrating the navigation method in accordance with one embodiment of the present disclosure.

FIGS. 3 to 7 are schematic views illustrating the navigation method. As shown in FIG. 3, the vessel V sails along the sailing path (along a trajectory from by nodes O, A, B and C). The node O indicates a sailing point that the vessel V has been passed through. The node A (e.g. the first node), the node B (e.g. the second node) and the node C (e.g. the third node) indicate at least one target point that the vessel is going to sail to. In one example, the node A indicates the next target point of the vessel V. Moreover, a first line segment OA is formed by the node O (e.g. the sailing point) and the first node A, a second line segment AB is formed by the first node A and the second node B, and a third line segment BC is formed by the second node B and the third node C.

When the vessel V sails to a position less than a first length D1 from the first node A, a first tracking point P1 (e.g. new tracking point) is generated on the second line segment AB. The original sailing path of the vessel V (auto-tracking), which tracks the first node A, is changed into the sailing path (auto-tracking) by tracking the first tracking point P1 (as shown by the bold dotted line in the figure). The first tracking point P1 is away from the first node A by a second length D2.

Figure 4:
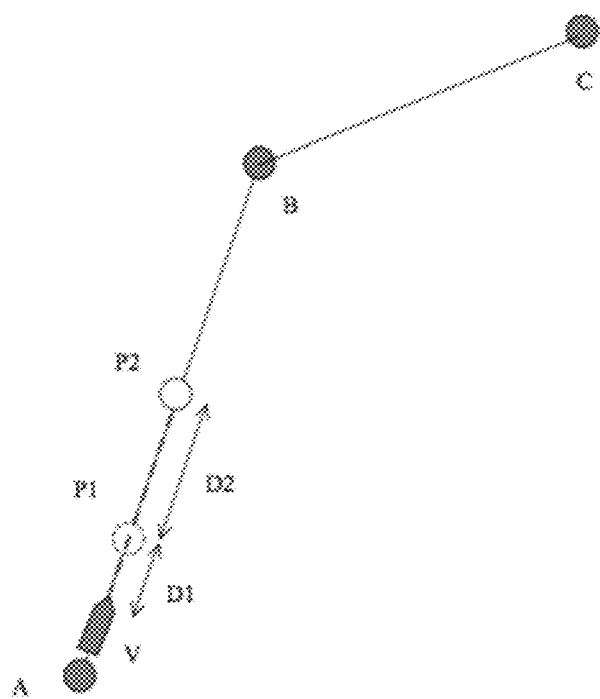
FIG. 4 is a schematic view illustrating the navigation method in accordance with one embodiment of the present disclosure.

As show in FIG. 4, when the vessel V sails by tracking the first tracking point P1 and sails to the position less than the first length D1 from the first tracking point P1 (e.g. the vessel has passed through the first node A at this time), a second tracking point P2 (e.g. new tracking point) is generated on the second line segment AB. The original sailing path (auto-tracking) of the vessel V, which tracks the first tracking point P1, is changed into the sailing path (auto-tracking) by tracking the second tracking point P2 (e.g. new tracking point) (as shown by the bold dotted line in the figure). The second tracking point P2 is away from the first tracking point P1 by the second length D2.

Figure 5:
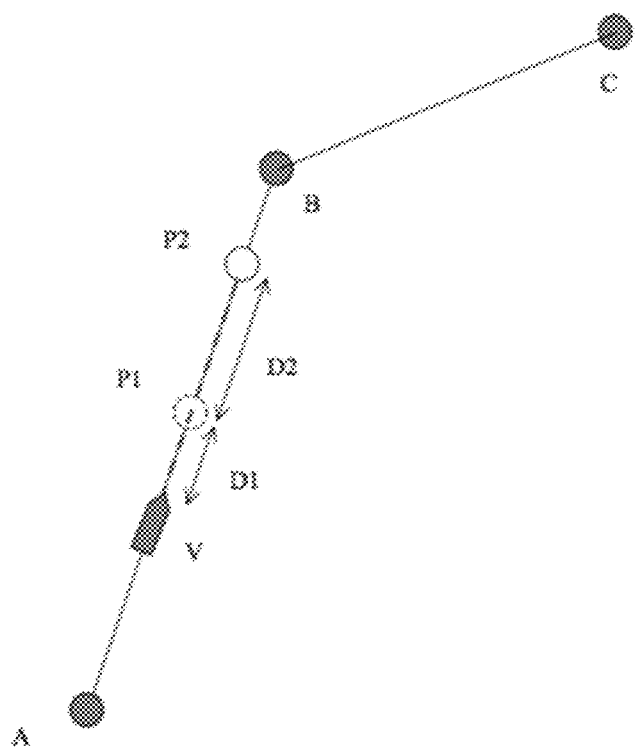
FIG. 5 is a schematic view illustrating the navigation method in accordance with one embodiment of the present disclosure.

As shown in FIG. 5, when the vessel V tracks the second tracking point P2 shown in FIG. 4 (indicated by the tracking point P1 in FIG. 5) and is close to the position less than the first length D1 from the first tracking point P1, the tracking point P2 is generated on the second line segment AB. The original sailing path (auto-tracking) of the vessel V, which tracks the first tracking point P1, is changed into the sailing path (auto-tracking) by tracking the tracking point P2 (e.g. new tracking point) (as shown by the bold dotted line in the figure). The tracking point P2 is away from the tracking point P1 by the second length D2.

Figure 6:
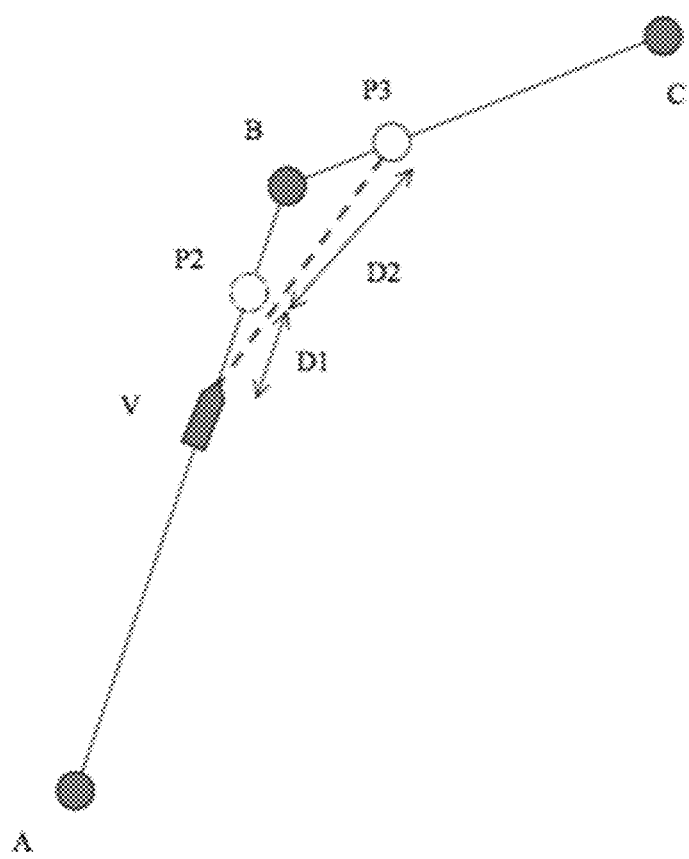
FIG. 6 is a schematic view illustrating the navigation method in accordance with one embodiment of the present disclosure.

Further, referring to FIG. 5 and FIG. 6, when a distance between the second tracking point P2 and the second node B is less than the second length D2, a third tracking point P3 is generated on the third line segment BC. The vessel V sails by tracking (auto-tracking) the tracking point P3. Specifically, when the vessel V tracks the second tracking point P2, as shown in FIG. 5, and is close to a position less than the first length D1 from the second tracking point P2, a new tracking point used to be generated on the second line segment AB. However, a distance between the second tracking point P2 and the second node B is less than the second length D2, so that the new tracking point may not able to be generated on the second line segment AB. Therefore, the new tracking point (e.g. the third tracking point P3) is generated on a line segment (e.g. a third line segment BC) next to the second line segment AB. The original sailing path (auto-tracking) of the vessel V, which tracks the second tracking point P2, is changed into the sailing path (auto-tracking) by tracking the third tracking point P3 (e.g. new tracking point) (as shown by the bold dotted line in the figure). The third tracking point P3 is away from the second tracking point P2 by the second length D2.

Figure 7:
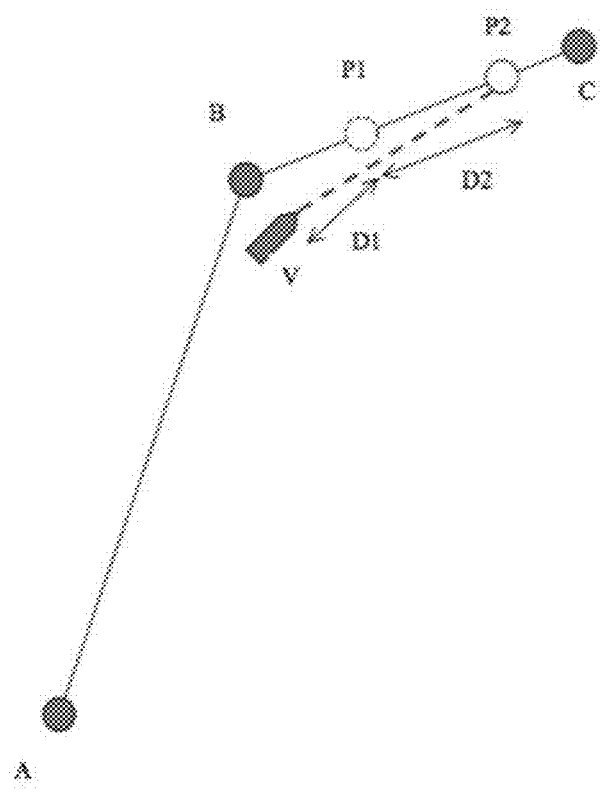
FIG. 7 is a schematic view illustrating the navigation method in accordance with one embodiment of the present disclosure.

Conventionally, it is easily to have an overshoot effect at the turning positions, which is resulted from the over-rudder (or overshooting) for modify the deviation. By comparison, as shown in FIG. 7, the navigation method of the present disclosure is able to track (auto-tracking) the new tracking point to automatically modify a direction of the rudder, so as to reduce the increasing time and wasted fuel resulting from the overshoot. In another example, as shown in FIG. 7, the navigation method is similar with the navigation method shown in FIG. 4. When the vessel V tracks the third tracking point P3 shown in FIG. 6 (indicated by the tracking point P1 in FIG. 7) and is close to the position less than the first length D1 from the first tracking point P1 (e.g. the vessel V has passed through the second node B at this time), the new tracking point P2 is generated on the third line segment BC. The original sailing path (auto-tracking) of the vessel V, which tracks the first tracking point P1, is changed into the sailing path (auto-tracking) by tracking the second tracking point P2 (e.g. new tracking point) (as shown by the bold dotted line in the figure). The second tracking point P2 is away from the first tracking point P1 by the second length D2.

In one example, the first length D1 is twice as much as a length between perpendiculars (LPP), and the second length D2 is triple as much as the LPP. The LPP is the length of a ship along the waterline from the forward surface of the stem, or main bow perpendicular member, to the after surface of the sternpost, or main stern perpendicular member. When there is no sternpost, the centerline axis of the rudder stock is used as the aft end of the length between perpendiculars.

In another example, the first length D1 and the second length D2 may be set according to user requirement, a distance between the first length D1 and the second length D2 may be automatically adjusted according to the external environment or a degree of deviation of the sailing path, and the present disclosure is not limited thereto. For example, when a sensor detects a distance that the vessel deviates from the sailing path is within a correctable range (e.g. safety range), the first length D1 and the second length D2 may have a tolerance range within plus and minus 20% of the original length (i.e. twice as much as the LPP and triple as much as the LPP, respectively). If the distance that the vessel deviates from the sailing path is outside of the correctable range, the tolerance of the first length D1 and the second length D2 must be minimized to facilitate the modification of the sailing path to resume to the original sailing path. Thus, the tolerance range is within 20% of the LPP.

As shown in FIGS. 3 to 7, the vessel may repeat the above steps until the vessel passes through each target point (e.g. each node). In other words, the user only needs to set a starting point and an ending point of the sailing path, and the nodes between the starting point and the ending point, the vessel may be able to automatically sail to the ending point according to the trajectory formed by each node from the starting point to complete the navigation of the vessel. In addition, the navigation method described above may be implemented by the vessel navigation system shown in FIG. 1.

Specifically, the above navigation method stimulates magnetic repulsive effect. That is, when the vessel is close to the tracking point on the connecting line formed by the nodes, the tracking point may automatically "bounce" forward and form a new tracking point (still on the connecting line formed by the nodes). Such that, the tracking point may always be located at the front of the vessel by a predetermined distance (e.g. the second length D2) until the vessel tracks the last node by following the trajectory formed by each node. It is noted that, when a distance between the new tracking point and the original tracking point (e.g. the second length D2) is less than a distance between the original tracking point and the next node, the new tracking point may be generated on the next line segment. If the next line segment is at the turning point, as shown in FIG. 5, the tracking point may enter the line segment after the turning point (e.g. the tracking point P3 on the line segment BC) in advance. Such that, the rudder of the vessel may be able to modify the sailing path by tracking the new tracking point, so as to prevent the overshoot to occur at the turning point.

Figure 9:
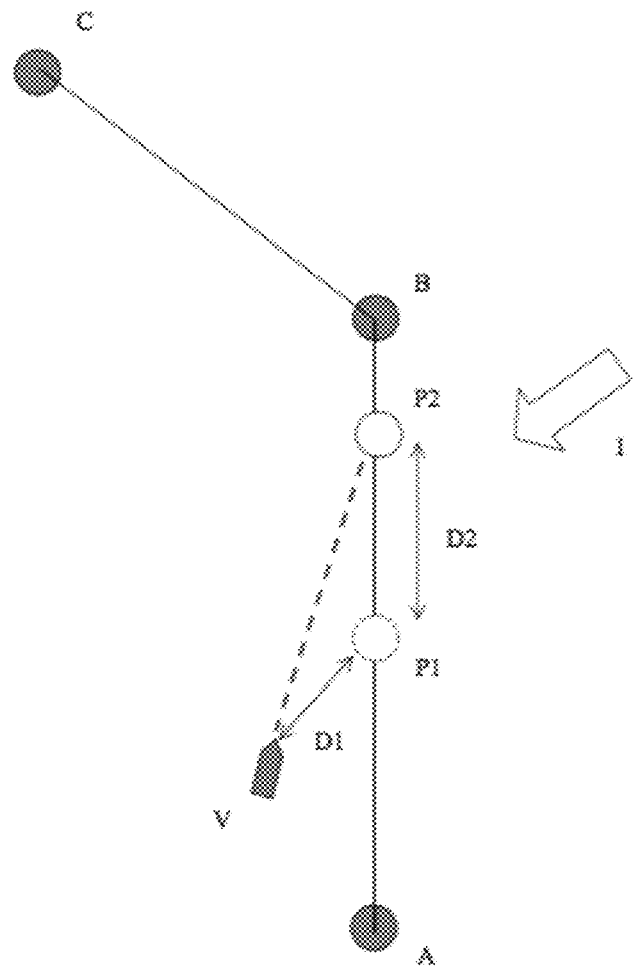
FIG. 9 is a schematic view illustrating the navigation method in accordance with another embodiment of the present disclosure.
Figure 10:
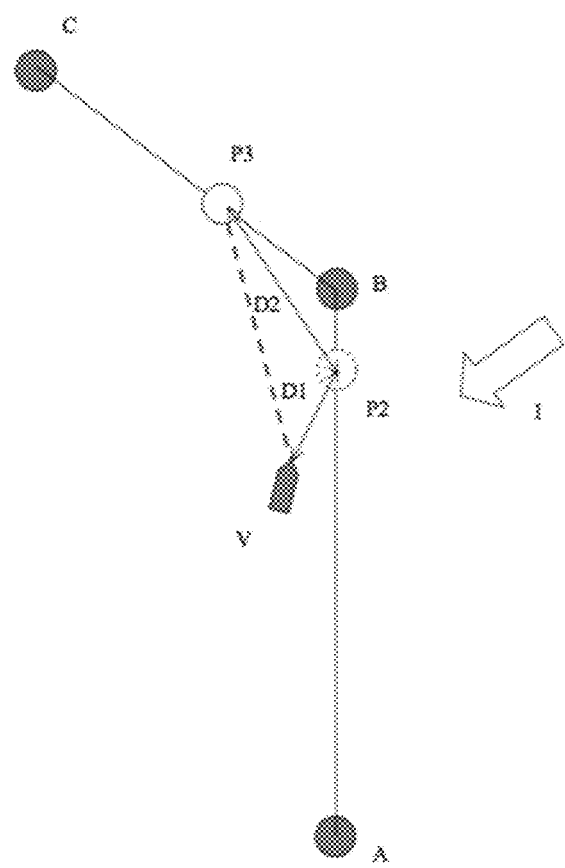
FIG. 10 is a schematic view illustrating the navigation method in accordance with another embodiment of the present disclosure.
Figure 11:
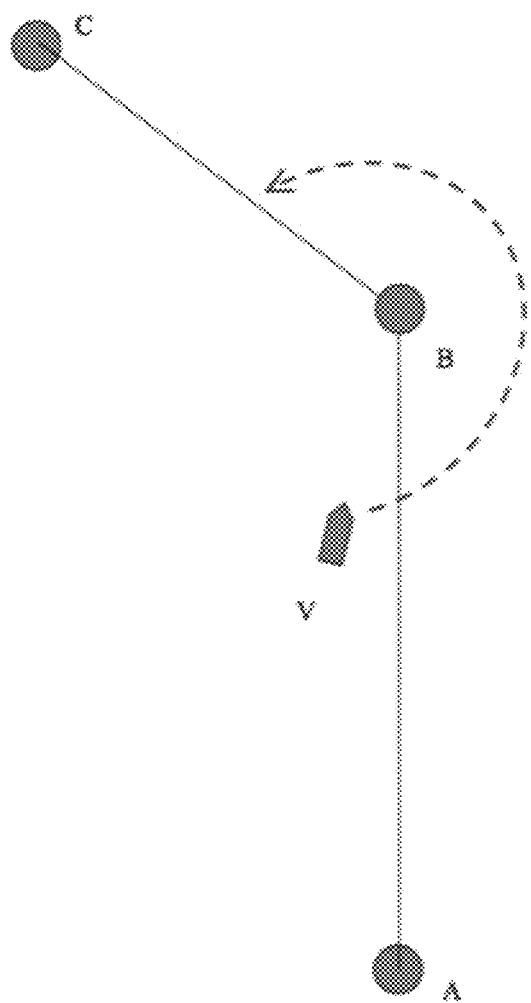
FIG. 11 is a schematic view illustrating an overshoot occurred in conventional navigation method.

Moreover, when the vessel deviates from the original sailing path due to the external factor, the above navigation method may be adopted to correct the sailing path, such that the vessel may be able to automatically and stably return to the original sailing path. Referring to FIG. 8A to 10, FIG. 8A and FIG. 8B are flowcharts illustrating a navigation method in accordance with another embodiment of the present disclosure. FIG. 9 and FIG. 10 are schematic views illustrating a navigation method in accordance with another embodiment of the present disclosure.

Figure 8A:
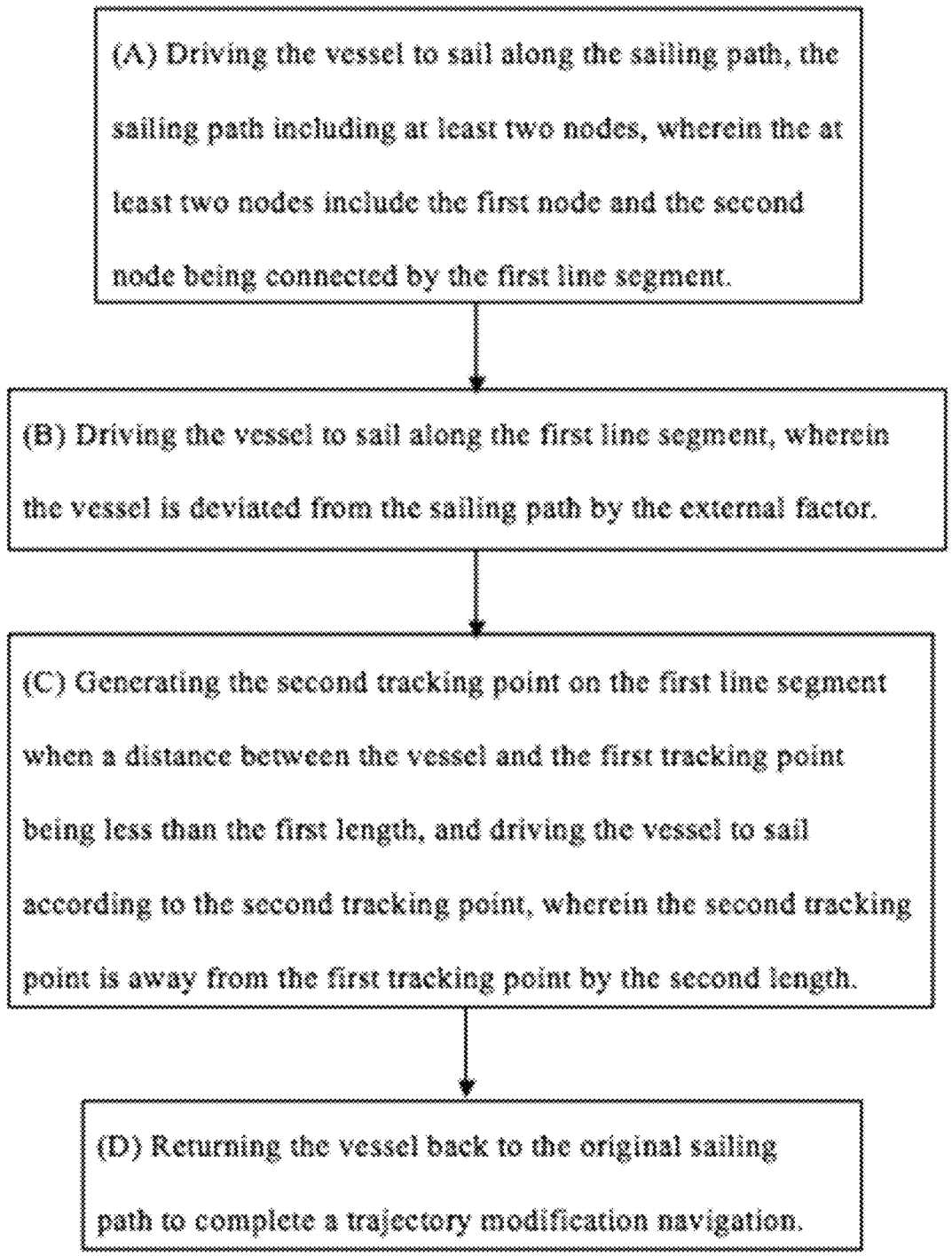
FIG. 8A is a flowchart illustrating a navigation method in accordance with another embodiment of the present disclosure.

In one example, as shown in FIG. 8A, the navigation method includes the following steps. (A) driving the vessel to sail along the sailing path, the sailing path including at least two nodes, wherein the at least two nodes include the first node and the second node connected by the first line segment; (B) driving the vessel to sail along the first line segment, wherein the vessel is deviated from the sailing path by the external factor; (C) generating the second tracking point on the first line segment when the distance between the vessel and the first tracking point being less than the first length, and driving the vessel to sail according to the second tracking point, wherein the second tracking point is away from the first tracking point by the second length; and (D) returning the vessel back to the original sailing path to complete a trajectory modification navigation.

In another example, as shown in FIG. 8B, the navigation method includes the following steps. (E) driving the vessel to sail along the sailing path, the sailing path including at least two nodes, wherein the at least two nodes include the first node, the second node and the third node, the first node and the second node are connected by the first line segment, and the second node and the third node are connected by the second line segment; (F) driving the vessel to sail along the first line segment, wherein the vessel is deviated from the sailing path by the external factor; (G) generating the second tracking point on the first line segment when the distance between the vessel and the first tracking point being less than the first length, and driving the vessel to sail according to the second tracking point, wherein the second tracking point is away from the first tracking point by the second length; and (H) returning the vessel back to the original sailing path to complete the trajectory modification navigation. The difference between the navigation method shown in FIG. 8A and FIG. 8B resides in that the cross-node effect occurs in FIG. 8B due to the distance between the original tracking point and the next node is less than the second length and the new tracking point has to be located on the connecting line formed by the original node and the next node.

In addition, the difference between the navigation method in this example and the navigation method shown in FIG. 2A and FIG. 2B resides in that the vessel may deviate from the original sailing path due to the external factor. The external factor detected by the detecting module may include (as shown in FIG. 1) the wind, the waves, the ocean currents, the obstacles or combinations thereof. Or, the external factor may be the emergency event detected by the detecting module during the sailing path, such as another vessel sails into the predetermined sailing path, the reef or the large ocean creature appears in the sailing path. The above situations may cause the vessel to deviate from the original sailing path to avoid the obstacles.

FIG. 9 and FIG. 10 are schematic views illustrating a navigation method in accordance with another embodiment in the present disclosure. In one example, as shown in FIG. 9, when the vessel V deviates from the original sailing path (e.g. the line segment AB) due to a sudden external factor I, the vessel V may still sail by tracking an original tracking point P1. When a distance between the vessel and the original tracking point P1 is less than the first length, a new tracking point P2 may be generated on the original sailing path (e.g. the line segment AB), and the vessel may be driven to sail according to the new tracking point P2 (as shown by the bold dotted line in the figure). The new tracking point P2 is away from the original tracking point P1 by the second length.

In another example, as shown in FIG. 10, when a distance between the tracking point P2 and the node B is less than the second length D2, a new tracking point P3 may be generated on the next line segment BC, and the vessel sails by tracking the new tracking point P3 (auto-tracking). Specifically, when the vessel V tracks the tracking point P2, as shown in FIG. 9, and is close to the position less than the first length D1 from the tracking point P2, a new tracking point used to be generated on the original line segment AB. However, a distance between the tracking point P2 and the node B is less than the second length D2, so that the new tracking point may not able to be generated on the original line segment AB. Therefore, a new tracking point P3 is generated on a line segment BC next to the original line segment AB. The original sailing path (auto-tracking) of the vessel V, which tracks the tracking point P2, is changed into the sailing path (auto-tracking) by tracking the new tracking point P3 (as shown by the bold dotted line in the figure). The new tracking point P3 is away from the original tracking point P2 by the second length D2.

In one example, the first length D1 is twice as much as the LPP, and the second length D2 is triple as much as the LPP.

In view of the above, the navigation method of the present disclosure may be able to automatically modify the sailing path which deviates from the original sailing path, no matter the deviation is resulting from the external factor or due to the vessel is located at the turning point, to resume the vessel back onto the connecting line formed by the nodes. Such that, the vessel may be able to sail along the predetermined sailing path.

The above description is merely the embodiments in the present disclosure, the claim is not limited to the description thereby. The equivalent structure or changing of the process of the content of the description and the figures, or to implement to other technical field directly or indirectly should be included in the claim. All other embodiments obtained by a person of ordinary skill in the art based on the embodiments of the present disclosure without creative efforts shall fall within the protection scope of the present disclosure.

REFERENCE SIGNS 10 navigation system
100 data transceiver
200 processor
210 path navigator
220 database
300 direction controller
400 propeller module
500 detecting module
600 positioning module
700 wireless communicator
800 external device
900 automatic obstacle-avoiding module
1000 information security module
V vessel
O, A, B, C node
P1, P2, P3 tracking point
D1 first length
D2 second length
I external factor
(a)-(d) steps
(e)-(h) steps
(A)-(D) steps
(E)-(H) steps

What is claimed is:

1. A navigation method, comprising:
   (a) driving a vessel to sail along a sailing path, the sailing path comprising at least two nodes, wherein the at least two nodes comprise a first node and a second node being connected by a first line segment;

(b) generating a first tracking point on the first line segment when a distance between the vessel and the first node being less than a first length, and driving the vessel to sail according to the first tracking point, wherein the first tracking point is away from the first node by a second length;

(c) generating a second tracking point on the first line segment when a distance between the vessel and the first tracking point being less than the first length, and driving the vessel to sail according to the second tracking point, wherein the second tracking point is away from the first tracking point by the second length; and (d) repeating the step (b) and step (c) until the vessel passes through each node;

wherein the first length is twice as much as a length between perpendiculars (LPP) of the vessel, and the second length is triple as much as the perpendiculars (LPP) of the vessel.

2. The navigation method according to claim 1, wherein after the step (a), the navigation method further comprises:
step (a1), driving the vessel to sail along the first line segment, wherein the vessel is deviated from the sailing path by an external factor.

3. The navigation method according to claim 2, wherein the external factor comprises wind, waves, ocean currents, obstacles or combinations thereof.

4. The navigation method according to claim 1, wherein the at least two nodes further comprise a third node, and the first node and the second node are connected by a first line segment, and the second node and the third node are connected by a second line segment.

5. The navigation method according to claim 4, wherein after the step (a), the navigation method further comprises:
step (a1), driving the vessel to sail along the first line segment, wherein the vessel is deviated from the sailing path by an external factor.

6. The navigation method according to claim 4, wherein the second tracking point generated on the second line segment when a distance between the vessel and the first tracking point being less than the first length and a distance between the first tracking point and the second node being less than the second length, driving the vessel to sail according to the second tracking point, and wherein the second tracking point is away from the first tracking point by the second length.

7. A vessel navigation system, comprising:
a data transceiver configured to receive a sailing path;
a processor connected to the data transceiver, wherein the processor comprises a path navigator, the path navigator is configured to generate a course control command and a speed control command by configuring the sailing path in accordance with a navigation method;
a direction controller connected to the processor, wherein the direction controller is configured to control a direction of a vessel according to the course control command; and
a propeller module connected to the processor, wherein the propeller module is configured to control a speed of the vessel according to the speed control command;
wherein the navigation method comprises:
(a) driving a vessel to sail along a sailing path, the sailing path comprising at least two nodes, wherein the at least two nodes comprise a first node and a second node being connected by a first line segment;
(b) generating a first tracking point on the first line segment when a distance between the vessel and the first node being less than a first length, and driving the vessel to sail according to the first tracking point, wherein the first tracking point is away from the first node by a second length;

(c) generating a second tracking point on the first line segment when a distance between the vessel and the first tracking point being less than the first length, and driving the vessel to sail according to the second tracking point, wherein the second tracking point is away from the first tracking point by the second length; and (d) repeating the step (b) and step (c) until the vessel passes through each node;

wherein the first length is twice as much as a length between perpendiculars (LPP) of the vessel, and the second length is triple as much as the perpendiculars (LPP) of the vessel.

8. The vessel navigation system according to claim 7, wherein the vessel navigation system further comprises a positioning module connected to the processor, and the positioning module is configured to obtain a current coordinate of the vessel.

9. The vessel navigation system according to claim 8, wherein the vessel navigation system further comprises a detecting module connected to the processor, and the detecting module is configured to detect at least one external environment data.

10. The vessel navigation system according to claim 9, wherein the external environment data comprises wind data, wave data, ocean current data, obstacle date or combinations thereof.

11. The vessel navigation system according to claim 9, wherein the vessel navigation system further comprises an automatic obstacle-avoiding module connected to the processor, the detecting module and the positioning module.

12. The vessel navigation system according to claim 9, wherein the detecting module comprises at least one environment detector and at least one vessel detector.

13. The vessel navigation system according to claim 12, wherein the at least one environment detector comprises an air pressure sensor, a temperature sensor, a wind direction sensor, a humidity sensor, an optical sensor, an acoustic sensor, a radar sensor, a lidar sensor, a camera, an automatic identification system (AIS) or combinations thereof.

14. The vessel navigation system according to claim 12, wherein at least one vessel detector comprises a fuel sensor, a power sensor, a gyroscope, a speed sensor, a rudder sensor, a tilt angle sensor or combinations thereof.

15. The vessel navigation system according to claim 8, wherein the positioning module comprises global positioning system (GPS), global navigation satellite system (GLONASS), Beidou satellite navigation positioning system, or combinations thereof.

16. The vessel navigation system according to claim 7, wherein the vessel navigation system further comprises a wireless communicator connected to the data transceiver, and the wireless communicator is configured to remotely receive the sailing path.

17. The vessel navigation system according to claim 16, wherein a communication connection of the wireless communicator is established by Bluetooth, Wi-Fi, cellular network, radio wave, satellite communication or combinations thereof.

18. The vessel navigation system according to claim 16, wherein the vessel navigation system further comprises an information security module connected to the processor and the wireless communicator.

19. The vessel navigation system according to claim 18, wherein the information security module comprises an intrusion-detection system (IDS), an authentication, an authorization and encryption system, a firewall system, a whitelisting system or combinations thereof.

20. The vessel navigation system according to claim 16, wherein the wireless communicator comprises an antenna, a Bluetooth communication module, a Wi-Fi communication module, a cellular network communication module, a radio wave communication module, a satellite communication module or combinations thereof.

21. The vessel navigation system according to claim 7, wherein the processor further comprises a digital ocean chart database connected to the path navigator, wherein the digital ocean chart database is configured to store historical sailing paths.

22. The vessel navigation system according to claim 21, wherein the digital ocean chart database is configured to store marine maps, a geographic information system (GIS), voyage data, international collision avoidance regulations (COLREGS) or combinations thereof.

23. The vessel navigation system according to claim 7, wherein the data transceiver is an industrial computer (IPC), a human machine interface (HMI), a single chip or combinations thereof.

24. The vessel navigation system according to claim 7, wherein the processor is a programmable logic controller (PLC), a microcontroller unit (MCU) or a combination thereof.

25. The vessel navigation system according to claim 7, wherein the direction controller comprises a rudder, an electronic steering system or a combination thereof.

26. The vessel navigation system according to claim 7, wherein the propeller module comprises a generator, an engine, a thruster, a throttle, a battery, a motor or combinations thereof.

* * * * *